Aug. 22, 1933.  J. C. McCUNE  1,923,157

FLUID PRESSURE BRAKE

Filed Sept. 24, 1929

INVENTOR
JOSEPH C. McCUNE
BY Wm. M. Cady
ATTORNEY

Patented Aug. 22, 1933

1,923,157

UNITED STATES PATENT OFFICE 1,923,157

FLUID PRESSURE BRAKE

Joseph C. McCune, Edgewood, Pa., assignor to The Westinghouse Air Brake Company, Wilmerding, Pa., a Corporation of Pennsylvania Application September 24, 1929
Serial No. 394,808

6 Claims. (Cl. 303—23)

This invention relates to fluid pressure brakes, and more particularly to an automatic brake, in which the brakes are applied by effecting a reduction in pressure in the brake pipe.

With the present automatic brake, a triple valve device is usually employed which comprises a piston subject to the opposing pressures of the brake pipe and an auxiliary reservoir having valve means operated by said piston upon a reduction in brake pipe pressure for supplying fluid under pressure from the auixiliary reservoir to the brake cylinder to effect an application of the brakes.

With an equipment of the above character it is necessary to employ an auxiliary reservoir of a volume proportional to the volume of the brake cylinder in order to provide the desired brake cylinder pressure for a given reduction in brake pipe pressure and for different weights of cars. Where brake cylinders of different volumes are required to correspond with the weight of the car, it will be seen that auxiliary reservoirs of different volumes are also required.

The pressure obtained in the brake cylinder for a given reduction in brake pipe pressure is thus dependent upon the reservoir volume and this is also the case where the braking power is adjusted according to the load on the car.

One object of my invention is to provide an automatic fluid pressure brake equipment in which the brake cylinder pressure obtained for a given reduction in brake pipe pressure is dependent upon the rate of flow of fluid to the brake cylinder rather than on the size of the reservoir, so that the same reservoir volumes may be employed for all brake cylinders and weights of cars.

Other objects and advantages will appear in the following more detailed description of the invention.

Figure 1:
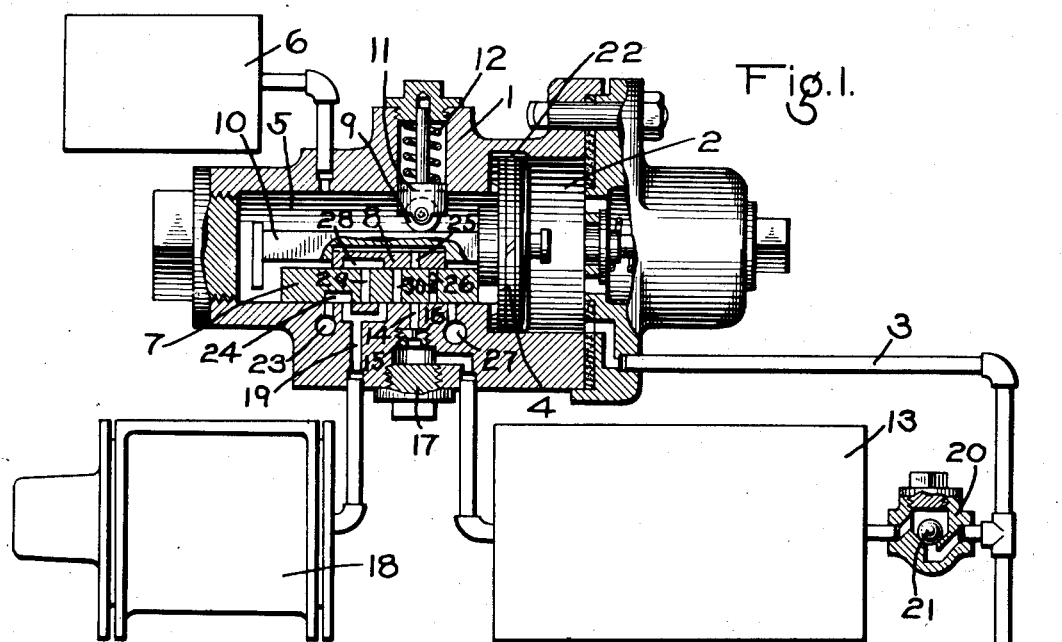
Figure 2:
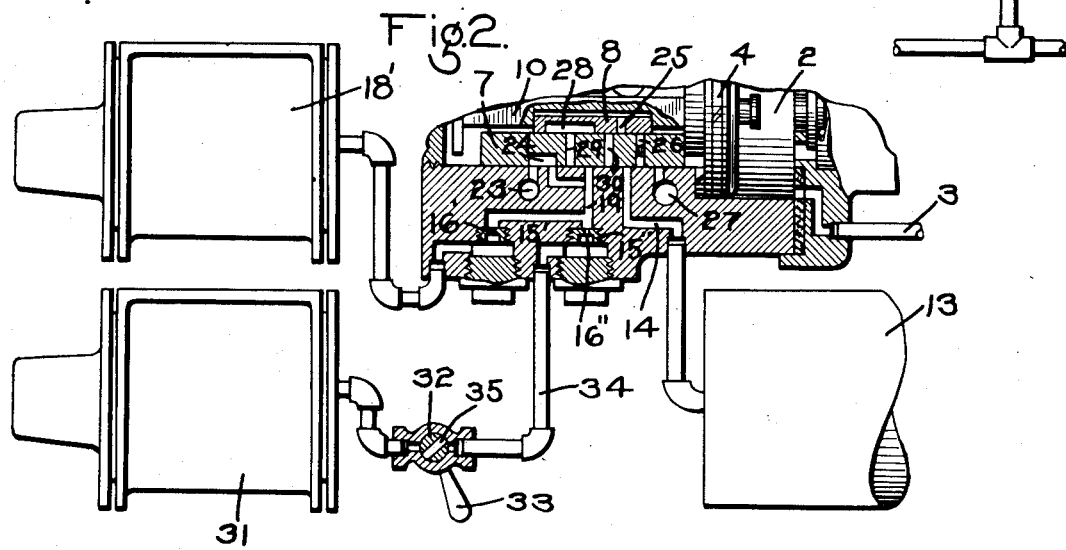

In the accompanying drawing; Figure 1 is a diagrammatic view, partly in section of a car fluid pressure brake equipment embodying my invention; Fig. 2 a diagrammatic view, showing my invention applied to an empty and load brake equipment; and Fig. 3 a diagrammatic view, showing means for automatically controlling the braking power according to the load on the car.

According to my invention, the brake controlling valve device may be in the form of a triple valve device comprising a casing 1, having a piston chamber 2, connected to a brake pipe 3 and containing a piston 4 and having a valve chamber 5, connected to a control reservoir 6 and containing a main slide valve 7 and an auxiliary slide valve 8 mounted on and having a movement relative to the main slide valve, said valve being operable by the piston 4.

To assist in maintaining the valves 7 and 8 seated, a roller 9 may be provided, which engages the stem 10 carried by the piston 4 and which is carried by a movable cage 11, subject to the pressure of a coil spring 12.

According to my invention, the control reservoir 6 is of the same volume, regardless of the volume of the brake cylinder, and an additional reservoir 13 is provided, from which fluid under pressure is supplied to the brake cylinder, upon operation of the controlling valve device.

The reservoir 13 is connected to a passage 14, leading to the seat of slide valve 7, and a removable choke plug 15 having a restricted port 16 is mounted in the casing 1, so as to control the rate of flow of fluid from the reservoir 13 through said passage.

A screw plug 17, screwed into the casing in axial alinement with the choke plug 15, permits removal and installation of choke plugs with different sized restricted ports.

A brake cylinder 18 is connected to a passage 19 leading to the seat of slide valve 7 and a check valve casing 20 is disposed in the pipe connection which connects the brake pipe 3 to the reservoir 13 and said casing contains a check valve 21, adapted to prevent back flow of fluid from the reservoir 13 to the brake pipe 3.

In operation, when the brake pipe 3 is charged in the usual manner with fluid under pressure, fluid flows to the piston chamber 2 of the triple valve device and thence through the usual feed groove 22 around the triple valve piston 4 to the valve chamber 5, charging said chamber and the control reservoir 6 to the pressure carried in the brake pipe.

The additional reservoir 13 is also charged to brake pipe pressure past the check valve 21.

The triple valve device being in release position, as shown in the drawing, the brake cylinder is connected to the atmospheric exhaust port 23, through cavity 24 in slide valve 7.

If it is desired to effect a service application of the brakes, a gradual reduction in brake pipe pressure is effected in the usual manner and thus the triple valve piston 4 is caused to move outwardly, first shifting the graduating valve 8 so as to cause the port 25 to register with port 26 in slide valve 7 and the cavity 28 to connect ports 29 and 30 in the main slide valve.

The main slide valve is then shifted, so that the ports 29 and 30 register respectively with passages 19 and 14. Fluid under pressure is then supplied from the additional reservoir 13, at a rate determined by the restricted port 16, to the brake cylinder 18, so as to effect an application of the brakes.

At the same time, port 26 connects with atmospheric exhaust port 27, so that fluid under pressure is vented from the valve chamber 5 and the control reservoir 6 to the atmosphere.

When the fluid pressure in the valve chamber 5 and control reservoir 6 has been reduced by flow to the atmosphere to a degree slightly less than the reduced pressure in the brake pipe, the piston 4 is moved back and causes the auxiliary valve 8 to be shifted so as to cut off communication through cavity 28 between ports 29 and 30, and so that port 25 is moved out of registry with port 26.

The further supply of fluid under pressure to the brake cylinder is thus cut off. The degree of pressure obtained in the brake cylinder depends upon the size of the restricted port 16 and the time that the auxiliary valve remains in application position, which time is in turn dependent upon the degree of reduction in brake pipe pressure, and the brake cylinder pressure obtained is thus independent of the volume of the control reservoir and the additional reservoir, so that reservoirs having the same volumes may be employed with brake cylinders of different volumes, by merely providing a choke plug having the proper size restricted port to correspond with the size of the brake cylinder employed.

If a greater brake cylinder pressure is desired, the brake pipe pressure may be further reduced so as to cause the piston 4 to again move out and shift the auxiliary valve 8, so as to again connect the ports 29 and 30 through cavity 28 and the port 25 with port 26, the further operation being the same as previously described in connection with effecting an initial application of the brakes.

In Fig. 2 of the drawing is shown an application of my invention to an empty and load brake equipment in which a brake cylinder 18' is provided for braking empty cars and a load brake cylinder 31 adapted to be cut in for braking loaded cars.

A removable choke plug 15' having a restricted port 16' is interposed in the passage leading to the empty brake cylinder 18' and a removable choke plug 15" having a restricted port 16" is interposed in the passage leading to the load brake cylinder 31. A cock 32 having an operating handle 33 is interposed in the pipe 34 leading to the load brake cylinder 31.

For empty car braking the cock 32 is turned to the position shown in Fig. 2, in which communication through pipe 34 to the brake cylinder 31 is cut off and in applying the brakes, fluid under pressure is supplied only to the empty car brake cylinder 18'.

The triple valve device is of the same construction and operates in the same manner as the triple valve device shown in Fig. 1 except that when the cock 32 is turned to its open position by handle 33, the port 35 in the cock establishes communication through pipe 34 to the load brake cylinder 31, so that fluid under pressure in applying the brakes is supplied to both brake cylinders 18' and 31, through the respective restricted ports 16' and 16".

The volume of the reservoir 13 is such that an ample supply of fluid under pressure is provided to give the desired brake cylinder pressure for a given reduction in brake pipe pressure.

Figure 3:
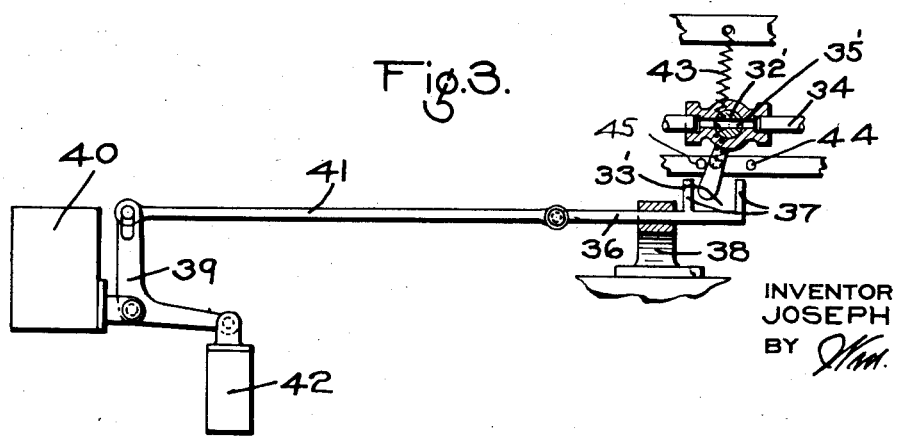

Instead of operating the cock 32 by hand, it may be operated automatically, as shown in Fig. 3. In this case a sliding bar 36 having spaced fingers 37 is slidably mounted in a bearing member 38 secured to the car and the fingers 37 are so positioned that lateral movement of the bar 36 will cause the fingers 37 to engage the handle 33'.

A bell crank 39 is pivotally mounted on the body bolster 40 of the car and one arm of said bell crank is pivotally connected to a rod 41, which in turn is pivotally connected to the bar 36. The other arm of the bell crank is pivotally connected to the truck transom 42 of the car, so that when the car is loaded and the car springs are depressed, the bell crank 39 will assume the position shown in Fig. 3.

When the car is unloaded the car body rises on its springs and the bell crank 39 is operated to shift the bar 36 toward the right. The left hand finger 37 then engages and operates the handle 33' in a direction tending to move the cock 32 to its closed position. When the handle 33' has been shifted to its vertical position or slightly beyond, a spring 43 will act to throw the handle 33' past the center line to the right, until the handle engages a stop pin 44 and in this position, communication through the pipe 34 to the load brake cylinder 31 is cut off.

When the load on the car is increased, the sliding bar 36 is shifted toward the left, and the right hand finger 37 then engages the handle 33' and shifts the handle toward the left. As soon as the handle passes the center vertical line, the spring 43 acts to flip the handle to left, until it engages the stop pin 45, in which position, the port 35' in the cock 32, establishes communication through pipe 34 to the load brake cylinder 31.

The supply reservoir 13 being of very large volume, relative to the volume of the brake cylinder, an emergency or full service pressure can be obtained which is almost equal to the normal brake pipe pressure.

The volume of the control reservoir 6 being quite small, the release action of the brakes is improved, since the control reservoir pressure will always be less than the pressure in the supply reservoir 13, after the brakes have been applied, so that the triple valve device will promptly move to release position when the brake pipe pressure is increased to effect the release, and consequently the recharge of the reservoir 13 does not interfere with the movement of the triple valve device to release position, since it occurs after the triple valve parts move to release position.

Another advantage of my invention is that substantially the same brake cylinder pressure will be obtained for a given reduction in brake pipe pressure, regardless of the brake cylinder piston travel, since the brake cylinder pressure is not dependent on the relative volumes of the auxiliary reservoir and the brake cylinder, as in the usual brake equipment.

The large volume supply reservoir also provides a reserve for repeated brake applications.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. In a fluid pressure brake, the combination with a brake pipe, of two brake cylinders, a control reservoir, an additional reservoir, a control valve device subject to the opposing pressures of the control reservoir and the brake pipe and operated upon a reduction in brake pipe pressure for supplying fluid under pressure from said additional reservoir to the brake cylinders, and means including a removable choke plug having a restricted port through which fluid is supplied to one brake cylinder, and a removable choke plug having a restricted port through which fluid is supplied to the other brake cylinder for independently regulating the delivery of fluid to said brake cylinder from said additional reservoir so as to obtain desired fluid pressures in each brake cylinder.

2. In a fluid pressure brake, the combination with a brake pipe, of two brake cylinders, a control reservoir, an additional reservoir, a control valve device subject to the opposing pressures of the control reservoir and the brake pipe and operated upon a reduction in brake pipe pressure for supplying fluid under pressure from said additional reservoir to the brake cylinders and for venting fluid under pressure from said control reservoir to the atmosphere, a removable choke having a restricted port through which fluid is supplied from said additional reservoir to one brake cylinder, and a removable choke plug having a restricted port through which fluid under pressure is supplied from the additional reservoir to the other brake cylinder.

3. In an empty and load brake, the combination with a brake pipe, of an empty car brake cylinder, a load brake cylinder, a control reservoir, an additional reservoir, a control valve device subject to the opposing pressures of the control reservoir and the brake pipe and operated upon a reduction in brake pipe pressure for supplying fluid under pressure solely from said additional reservoir to both brake cylinders for effecting an application of the brakes on a loaded car, and means for cutting off communication thorugh which fluid is supplied to the load brake cylinder, so that the control valve device then operates to supply fluid under pressure only to the empty brake cylinder for effecting an application of the brakes on an empty car.

4. In a fluid pressure brake, the combination with a brake pipe, of two brake cylinders, a control reservoir, an additional reservoir, a control device subject to the opposing pressures of the control reservoir and the brake pipe and operated upon a reduction in brake pipe pressure for supplying fluid under pressure from said additional reservoir to the brake cylinder for a predetermined time, and means including alterable passages through which fluid is separately supplied to said brake cylinders from said additional reservoir for regulating the rate of delivery of such fluid so as to obtain desired fluid pressures in each brake cylinder within said predetermined time.

5. In a fluid pressure brake, the combination with a brake pipe, of two brake cylinders, a control reservoir, an additional reservoir, a control device subject to the opposing pressures of the control reservoir and the brake pipe and operated upon a reduction in brake pipe pressure for supplying fluid under pressure from said additional reservoir to the brake cylinder for a predetermined time, and independently alterable means for separately regulating the rate of delivery of said fluid to the brake cylinders so as to obtain desired fluid pressures in each brake cylinder within said predetermined time.

6. In a fluid pressure brake, the combination with a brake pipe, of two brake cylinders, a control reservoir, an additional reservoir, a control device subject to the opposing pressures of the control reservoir and the brake pipe and operated upon a reduction in brake pipe pressure for supplying fluid under pressure from said additional reservoir to the brake cylinder for a predetermined time, and means for separately regulating the rate of delivery of said fluid to the brake cylinders so as to obtain different pressures in each brake cylinder within said predetermined time.

JOSEPH C. McCUNE.